United States Patent
Tamura

Patent Number: 6,108,693
Date of Patent: Aug. 22, 2000

[54] SYSTEM AND METHOD OF DATA COMMUNICATION IN MULTIPROCESSOR SYSTEM

[75] Inventor: Masanori Tamura, Tokyo, Japan

[73] Assignee: NEC Corporation, Tokyo, Japan

[21] Appl. No.: 09/170,718

[22] Filed: Oct. 14, 1998

[30]   Foreign Application Priority Data

Oct. 17, 1997  [JP]  Japan ..................... 9-303476

[51] Int. Cl.$^7$ ..................................... G06F 13/14
[52] U.S. Cl. .................... 709/213; 709/215; 709/312; 711/153; 711/157
[58] Field of Search .................... 709/213, 215, 709/230, 232, 312; 710/52, 53; 711/129, 130, 131, 147, 150, 153, 157

[56]           References Cited

U.S. PATENT DOCUMENTS

| | | | |
|---|---|---|---|
| 5,815,167 | 9/1998 | Muthal et al. ......................... | 345/512 |
| 6,044,438 | 3/2000 | Olnowich ............................. | 711/130 |

FOREIGN PATENT DOCUMENTS

| | | |
|---|---|---|
| 60-258670 | 12/1985 | Japan . |
| 63-71766 | 4/1988 | Japan . |
| 63-149762 | 6/1988 | Japan . |
| 1-166646 | 6/1989 | Japan . |
| 1-298843 | 12/1989 | Japan . |
| 6-348656 | 12/1994 | Japan . |
| 7-319840 | 12/1995 | Japan . |
| 8-16540 | 1/1996 | Japan . |

*Primary Examiner*—Viet D. Vu
*Attorney, Agent, or Firm*—Sughrue, Mion, Zinn, Macpeak & Seas, PLLC

[57]                ABSTRACT

A multiprocessor system has a transmitting processor and a receiving processor. In response to a transmission request, the transmitting processor implements means for selecting one of two communication buffers of a shared memory in accordance with a given rule; write inhibit means for changing the selected communication buffer to a write-disabled state in order to inhibit writing of the selected communication buffer by other processors; data writing means for copying data from a local memory to the selected communication buffer; write-completion notifying means for notifying a receiving processor of completion of writing; and transmission-end discriminating means for discriminating end of transmission processing. In response to a reception request, the receiving processor implements means for selecting one of the two communication buffers of the shared memory by a rule identical with that of the communication buffer selecting means of the transmitting processor; read wait means for causing this processor to wait until the selected communication buffer attains a read-enabled state; data reading means for copying data from the selected communication buffer to a local memory; read completion notifying means for changing the communication buffer to a write-enabled state after data is read in; and means for discriminating end of reception processing. The communication band-width performance is enhanced.

6 Claims, 6 Drawing Sheets

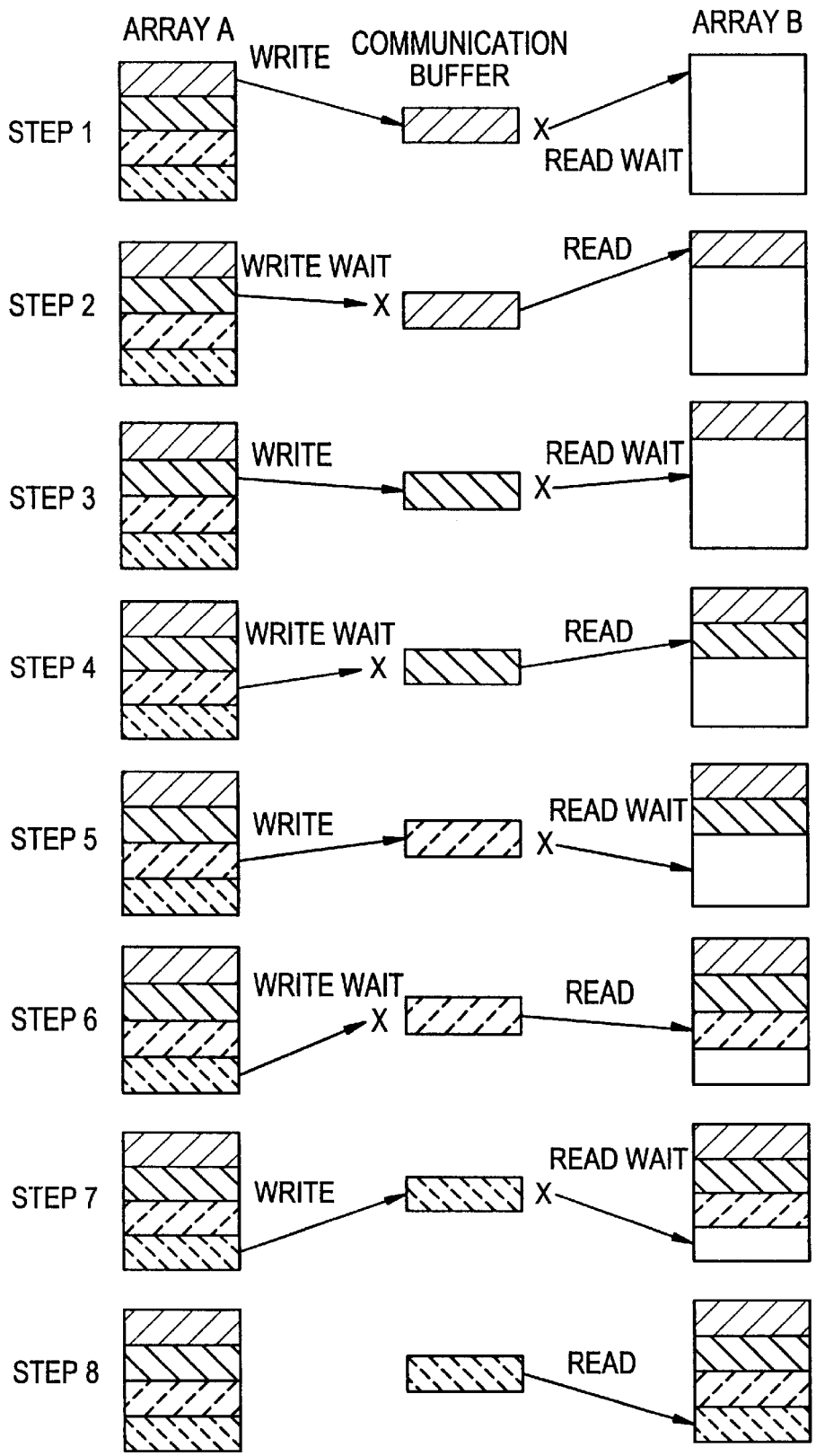

SYSTEM AND METHOD OF DATA COMMUNICATION IN MULTIPROCESSOR SYSTEM

FIELD OF THE INVENTION

This invention relates to a system and method of data communication in a multiprocessor system comprising a plurality of processors and a storage device. More particularly, the invention relates to a system and method of transmitting and receiving data upon partitioning the data via a communication buffer.

BACKGROUND OF THE INVENTION

Description of the Related Art

An example of a data communication system in a multi processor system according to the prior art is disclosed in Japanese Patent KOKAI JP-A-8-16540, which describes a method of communicating data between processors. Specifically, the specification proposes a message communication system in which each element processor has message receiving means for writing received messages to a memory area, which is provided for this element, in the order in which the messages arrive, and remote writing means for writing data directly to a memory area of a shared memory. At transmitting processor element uses the remote writing means to write the body of a message, which is to be transmitted to a receiving processor, to the shared memory, and transmits information identifying the message as well as pointer information pointing to the body of the message to the message receiving means of the receiving processor element.

In this message communicating method according to the prior art, transmitting/receiving is carried out in such a manner that the transmitting processor writes a message or part of the message via a communication buffer and the receiving processor reads in the message via the same communication buffer. However, the size of the communication buffer that can be secured in memory has an upper limit. If a message whose size is decided by user requirements exceeds the size of. the communication buffer, the transmitting and receiving processors repeat the same processing a number of times to transmit and receive parts of the message via the communication buffer.

SUMMARY OF THE DISCLOSURE

The following problem has been encountered during the course of the investigations toward the present invention.

During the time that the transmitting processor is writing part of the message to the communication buffer, the receiving processor, even though it is capable of reception, cannot read in the message until writing is finished. Conversely, during the time that the receiving processor is reading in part of a message from the communication buffer, the transmitting processor, even though it is capable of writing the next part of the message, cannot do so until reading is finished.

When divided data is thus transmitted and received via a single specific communication buffer, idle time involving waiting for the writing of data to the communication buffer or waiting for the reading of data from the buffer is produced. This leads to degraded communication performance, particularly a decline ineffective utilization of bandwidth.

Thus, in the example of the prior art set forth above, a single specific communication buffer consisting of continuous memory area is acquired between the transmitting and receiving processors. The result is the occurrence of idle time, namely time spent waiting for the writing of data to the communication buffer or time spent waiting for the reading of data from the communication buffer. This increases communication overhead and does not allow communication bandwidth to be used effectively.

Accordingly, an object of the present invention is to provide a data communication system or method that suppresses a decline in performance with regard to bandwidth in data communication performed in a multiprocessor system.

Further objects of the present invention will become apparent in the entire disclosure.

According to one aspect of the present invention, there is provided a data communication system in a multiprocessor system having a plurality of processors and a storage device that includes a shared memory, which is shared by the plurality of processors, and a local memory provided for each processor. On the one hand, a processor on a transmitting side includes: communication buffer selecting means for selecting one of two communication buffers of the shared memory in accordance with a given rule; write inhibit means for changing the selected communication buffer to a write-disabled state in order to inhibit writing of the selected communication buffer by other processors; data writing means for copying data from the local memory that corresponds to this processor to the selected communication buffer; write-completion notifying means for notifying a receiving processor of completion of writing; and transmission-end discriminatingmeans for discriminating end of transmission processing by judging whether all data to be transmitted has been written to the communication buffer. On the other hand, a processor on a receiving side includes: communication buffer selecting means for selecting one of the two communication buffers of the shared memory by a rule corresponding to that of the communication buffer selecting means of the processor on the transmitting side; read wait means for causing this processor to wait until the selected communication buffer attains a read-enabled state; data reading means for copying data from the selected communication buffer to the local memory that corresponds to this processor; read completion notifying means for changing the communication buffer to a write-enabled state after data is read in; and means for discriminating end of reception processing.

Typically, when transmitted data is written to a communication buffer, the communication buffer selecting means of the processor on the transmitting side writes the data by alternately selecting first and second communication buffers of the shared memory; and the buffer selecting means of the processor on the receiving side reads in data by alternately selecting the first and second communication buffers of the shared memory in accordance with a rule corresponding to that of the communication buffer selecting means of the processor on the transmitting side.

Preferably, the shared memory has, for each of the two communication buffers, a status flag for controlling write and read enable/disable of the communication buffer; the initial state of the status flag being write-enabled and read-disabled. The write inhibit means of the processor on the transmitting side sets the status flag of the selected communication buffer from write-enabled to write-disabled. The write-completion notifying means sets the status flag of the selected communication buffer from read-disabled to read-enabled. The read completion notifying means of the processor on the receiving side sets the status flag from write-disabled to write-enabled.

According to a second aspect of the present invention, there is provided a data communication system in a multi-processor system constituted by a plurality of processors and a storage device, wherein (1) the storage device has:
(1a) a shared memory area accessible from each of the processors; and (1b) local memory areas accessible only from specific processors among said plurality of processors.

A transmitting processor of the processors has:
(2a) communication buffer selecting means;
(2b) write inhibit means;
(2c) data writing means;
(2d) write-completion notifying means; and
(2e) transmission-end discriminating means;
(3) a receiving processor of said processors has:
(3a) communication buffer selecting means;
(3b) read wait means;
(3c) data reading means;
(3d) read completion notifying means; and
(3e) reception-end discriminating means.
(4) The transmitting processor responds to a transmission request by:
(4a) selecting one of two communication buffers of the shared memory by the communication buffer selecting means;
(4b) causing the write inhibit means to wait until a communication flag corresponding to the selected communication buffer attains a write-enabled state and, if the write-enabled state is attained, to change the communication flag to a write-disabled state so that data cannot be written to the communication buffer from other processors;
(4c) causing the data writing means to write transmitted data of a size equivalent to that of the communication buffer to the communication buffer;
(4d) changing the state of the communication flag corresponding to the communication buffer to a read-enabled state, while leaving the write-disabled state as is, by said write-completion notifying means after writing of the transmitted data to the communication buffer has been completed;
(4e) causing the transmission-end discriminating means to return control to the communication buffer selecting means if transmitted data remains and to terminate transmission processing if no transmitted data remains;
(4f) causing the communication buffer selecting means to which control has been returned to select the other of the two communication buffers that is different from the communication buffer that was selected previously; and
(4g) repeatedly executing processing for implementing each of the communication buffer selecting means, the write inhibit means, the data writing means, the write-completion notifying means and the transmission-end discriminating means until transmission processing is judged to have ended by the transmission-end discriminating means.
(5) The receiving processor responds to a reception request by:
(5a) selecting one of the two communication buffers of the shared memory by the communication buffer selecting means in accordance with an alternating rule corresponding to that used by the communication buffer selecting means of the transmitting processor;
(5b) causing the read wait means to wait until a communication flag corresponding to the selected communication buffer attains a read-enabled-state;
(5c) causing the data reading means to read in data from the communication buffer if the read-enabled state has been attained;
(5d) changing the communication flag to a read-disabled and write-enabled state by the read completion notifying means after read-in has been completed;
(5e) causing the reception-end discriminating means to return the control step to said communication buffer selecting means if data to be received remains, and to terminate reception processing if no data to be received remains;
(5f) causing said communication buffer selecting means to which the control step has been returned to select the other of said two communication buffers that is different from the communication buffer that was selected previously; and
(5g) repeatedly executing processing for implementing each of the communication buffer selecting means, the read wait means, the data reading means, read completion notifying means and the reception-end discriminating means until reception processing is judged to have ended by the reception-end discriminating means.

According to a further aspect of the present invention, there is provided a recording medium in a multiprocessing system having a plurality of processors and a storage device that includes a shared memory, which is shared by the plurality of processors, and a local memory provided for each processor, wherein the recording medium stores:

(1) a program in accordance with which a processor implements the function of the following steps (a) through (e):
  (a) selecting one of two communication buffers of said shared memory in accordance with a given rule;
  (b) changing the selected communication buffer to a write-disabled state in order to inhibit writing of the selected communication buffer by other processors;
  (c) copying data from the local memory that corresponds to this processor to the selected communication buffer;
  (d) notifying a receiving processor of completion of writing; and
  (e) discriminating end of transmission processing by judging whether all data to be transmitted has been written to the communication buffer; and
(2) a program in accordance with which a processor on the receiving side implements the function of the following steps (f) through (j):
  (f) selecting one of the two communication buffers of the shared memory by a rule corresponding to that of the communication buffer selecting step of the processor on the transmitting side;
  (g) performing control in such a manner that the processor on the receiving side is made to wait until the selected communication buffer-attains a read-enabled state;
  (h) copying data from the selected communication buffer to the local memory that corresponds to this processor;
  (i) changing said communication buffer to a write-enabled state after data is read in; and
  (j) discriminating end of reception processing.

Other features and advantages of the present invention will be apparent from the following description taken in

BRIEF DESCRIPTION OF THE DRAWINGS

FIG. 7 is a diagram schematically illustrating, on a step-by-step basis, the flow of data via two communication buffers according to the communication method of the prior art.

DESCRIPTION OF THE PREFERRED EMBODIMENTS

Figure 1:
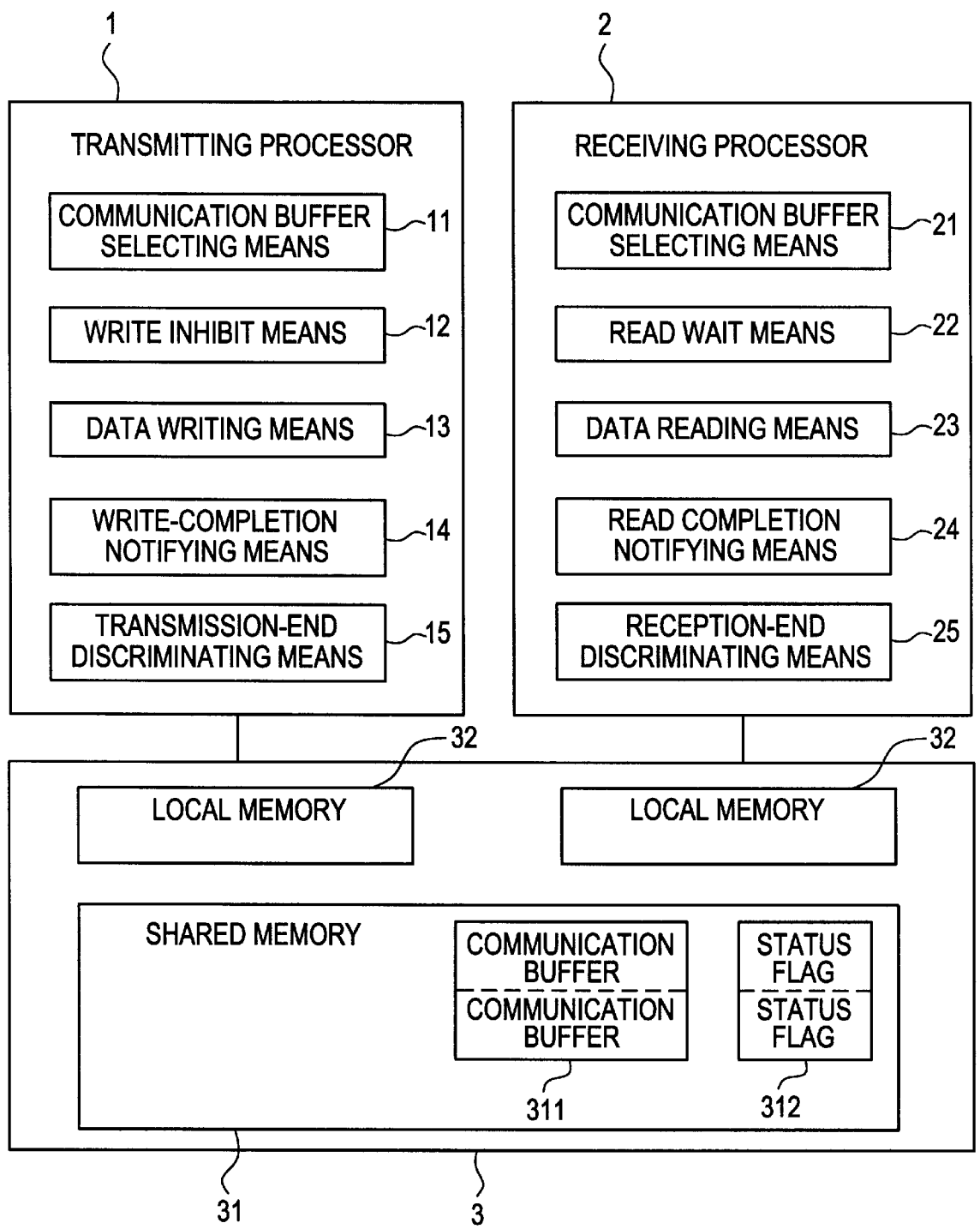
FIG. 1 is a diagram illustrating the implementation of a mode of practicing a data communication method in a multiprocessor system according to the present invention.

A mode for practicing the present invention will be described below.

In a preferred embodiment of the present invention, a data communication method in a multiprocessor system comprises a plurality of processors and a storage device, the storage device (3 in FIG. 1) including a shared memory (31 in FIG. 1) accessible from all connected processors, and local memories (32 in FIG. 1) each accessible from a specific processor, wherein two communication buffers (311 in FIG. 1) and status flags (312 in FIG. 1) corresponding to respective ones of these buffers are allocated to the shared memory on a per-processor basis.

When communication is carried out between processors, a transmitting processor (1 in FIG. 1) implements communication buffer selecting means (11 in FIG. 1) for selecting one of two communication buffers (311 in FIG. 1) provided, for each receiving processor, in the shared memory; write inhibit means (12 in FIG. 1) for setting status of a status flag corresponding to the selected communication buffer to "write-disabled" so that data from a transmitting processor other than this processor cannot be written to the selected communication buffer; data writing means (13 in FIG. 1) for copying, from a local memory to the write-inhibited communication buffer, data of a size equivalent to that of this communication buffer; write-completion notifying means (14 in FIG. 1) for changing the status flag to a read-enabled state, in such a manner that the receiving processor can read the data of a communication buffer, after writing of data is completed; and transmission-end discriminating means(15 in FIG. 1) for judging whether all data to be transmitted has been written to the communication buffer, returning control to the communication buffer selecting means (11 in FIG. 1) if writing of all data has not been completed, and terminating transmission processing if writing of all data has been completed.

The receiving processor (1 in FIG. 2) has communication buffer selecting means (21 in FIG. 1) for selecting one of the two communication buffers (311 in FIG. 1) of the shared memory (31 in FIG. 1) by a rule basically identical with (i.e., alternately corresponding to) that of the communication buffer selecting means (11 in FIG. 1) of the transmitting processor; read wait means (22 in FIG. 1) for causing waiting in regard to the selected communication buffer until the status flag corresponding to this communication buffer attains a state indicating completion of writing of data by the transmitting processor; data reading means (23 in FIG. 1) for copying data from the communication buffer to a local memory after writing is completed; read completion notifying means (24 in FIG. 1) which, in order that data will be written to a communication buffer, changes status of the status flag that corresponds to this communication buffer if reading in of data is finished; and reception-end discriminating means (25 in FIG. 1) for judging whether all data to be received has been read in a local memory, returning control to the communication buffer selecting means (21 in FIG. 1) if reading in of all data has not been completed, and terminating reception processing if reading in of all data has been completed. Each of the above-mentioned means or steps may be implemented by a processor under the control of a program.

In this mode of practicing the present invention, the data communication system is such that when data is transmitted and received between a transmitting processor and a receiving processor via two communication buffers upon partitioning the data into a size equivalent to the size of the buffers, it is possible to reduce idle time, namely time spent waiting for writing and time spent waiting for reading. This minimizes degradation of communication performance.

DETAILED DESCRIPTION OF THE PREFERRED EMBODIMENTS

A preferred embodiment of the present invention will now be described in detail with reference to the drawings.

FIG. 1 is a diagram for describing the implementation of a mode of practicing a data communication method. As shown in FIG. 1, this mode of practicing the invention includes a transmitting processor 1, a receiving processor 2 and a storage device 3 connected to the processors 1 and 2. The storage device 3 is divided into memory areas, namely a shared memory 31 and local memories 32. The shared memory 31 is provided with two communication buffers 3l1 (referred to as first and second communication buffers for the sake of description) for the receiving processor 2 and status flags 312 corresponding to respective ones of the buffers.

The transmitting processor 1 includes communication buffer selecting means 11 for selecting one of the communication buffers of the shared memory 31, write inhibit means 12 for inhibiting writing of the selected communication buffer, data writing means13 for copying data from the local memory 32 of this processor to the selected communication buffer 311; write-completion notifying means 14 for notifying the receiving processor of completion of copying of the data, and transmission-end discriminating means 15.

The receiving processor 2 includes communication buffer selecting means 21 for selecting one of the communication buffers 311 of this processor in the shared memory 31, read wait means 22 for causing waiting in regard to the selected communication buffer until the received data is written in, data reading means 23 for copying data from the communication buffer to the local memory 33 of this processor, read completion notifying means 24 for changing the status of the status flag of this communication buffer if copying of the data has been completed, and reception-end discriminating means 25.

Figure 2:
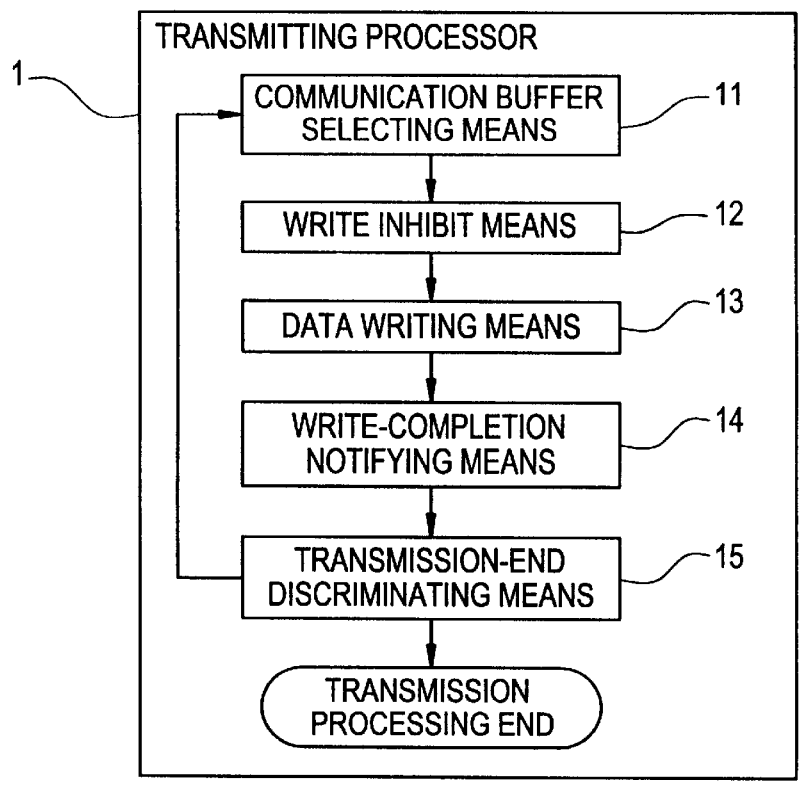
FIG. 2 is a diagram useful in describing the construction of, and flow of processing by, a transmitting processor according to the mode of practicing the present invention.
Figure 3:
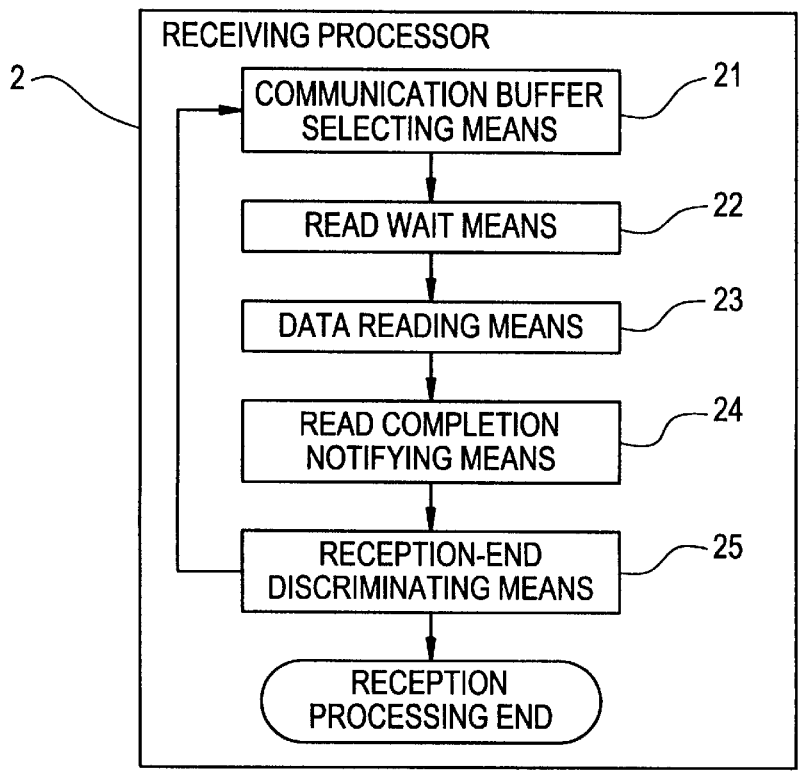
FIG. 3 is a diagram useful in describing the construction of, and flow of processing by, a receiving processor according to the mode of practicing the present invention.

Operation according to this mode of practicing the invention will be described in detail with reference to FIGS. 2 and 3. FIG. 2 is a diagram useful in describing the operation of the transmitting processor, and FIG. 3 is a diagram useful in describing the operation of the receiving processor.

With reference first to FIG. 2, the transmitting processor 1 executes processing for successively implementing the functions of the communication buffer selecting means 11, write inhibit means 12, data writing means 13, write-completion notifying means 14and transmission-end discriminating means 15. If transmission processing is to continue based upon the judgment made by the transmission-end discriminating means 15, then control returns to the communication buffer selecting means 11 and processing for implementing the means 11 through 15 is executed repeatedly until it is judged by the transmission-end discriminating means 15 that transmission processing has ended.

In response to a request for transmission of data, the communication buffer selecting means 11 selects one of the two buffers 311, which are provided beforehand in the shared memory 31, that correspond to the receiving processor, namely the processor that is communicating with the transmitting processor 1. If this is the first time for a selection to be made following a request, the communication buffer selecting means 11 selects the first communication buffer 11.

On the other hand, if control has returned to the communication buffer selecting means 11 from the transmission-end discriminating means 15, then the communication buffer selecting means 11 selects whichever communication buffer was not selected previously. For example, according to this rule, the communication buffer selecting means 11 selects the second communication buffer when processing is executed the second time and selects the first communication buffer again when processing is executed the third time. Thus, whenever control returns, the communication buffer selecting means 11 selects whichever communication buffer was not selected previously. Namely the selection is carried out alternately.

In regard to setting of the status flag 12 corresponding to the selected communication buffer 311,the write inhibit means 12 waits for write privilege to be acquired. Once this privilege has been acquired, writing to the selected communication buffer by other transmitting processors is forbidden.

After acquisition of the write privilege, data of a size equivalent to that of the communication buffer is copied from the local memory 32 to the selected communication buffer 311 by the data writing means 13 and the status flag 312 of the communication buffer is changed from read-disabled to read-enabled by the write-completion notifying means 14.

The transmission-end discriminating means 15 determines whether all data to be transmitted upon being divided down to the size of the communication buffers 311 has been sent. If unsent data remains, then the transmission-end discriminating means 15 returns the control step to the communication buffer selecting means 11. If no data remains, then transmission processing is terminated.

With reference first to FIG. 3, the receiving processor 2 responds to a reception request by executing processing for successively implementing the functions of the communication buffer selecting means21, read wait means 22, data reading means 23, read completion notifying means 24 and reception-end discriminating means 25. If reception processing is to continue based upon the judgment made by the reception-end discriminating means 25, then control returns to the communication buffer selecting means 21 and processing for implementing the means 21 through 25 is executed repeatedly until it is judged by the reception-end discriminating means 25 that reception processing has ended.

In response to a reception request, the communication buffer selecting means 21 selects one of the two buffers 311, which are provided beforehand in the shared memory 31, that correspond to the processor concerned. If this is the first time for a selection to be made following a request, the communication buffer selecting means 21 selects the first communication buffer. On the other hand, if the control step has returned to the communication buffer selecting means 21 from the reception-end discriminating means 25, then, in a manner similar to that of the communication buffer selecting means 11, the communication buffer selecting means 21 selects whichever communication buffer was not selected previously. For example, according to this rule, the communication buffer selecting means 21 selects the second communication buffer when processing is executed the second time and selects the first communication buffer again when processing is executed the third time. Thus, whenever control returns, the communication buffer selecting means 21 selects whichever communication buffer was not selected previously.

In regard to the selected communication buffer, the read wait means 22 waits until the status flag 312 of the selected communication buffer attains the read-enabled state. If read-in is enabled, the control step shifts to the data reading means 23 without the status of the status flag being changed.

The data reading means 23 copies data from the communication buffer 311 to the local memory 32, and the read completion notifying means 24 changes the status flag of the communication buffer from the read-disabled to the read-enabled state to make possible to writing of data from the transmitting processor.

Next, the reception-end discriminating means 25 determines whether all data to be received has been read in. If reading of all data has been completed, the reception-end discriminating means 25 terminates reception processing. If reading of all data has not been completed, the reception-end discriminating means 25 returns control to the communication buffer selecting means 21.

EXAMPLES

The preferred embodiment of the present invention will now be described in greater detail with reference to the drawings.

Figure 4:
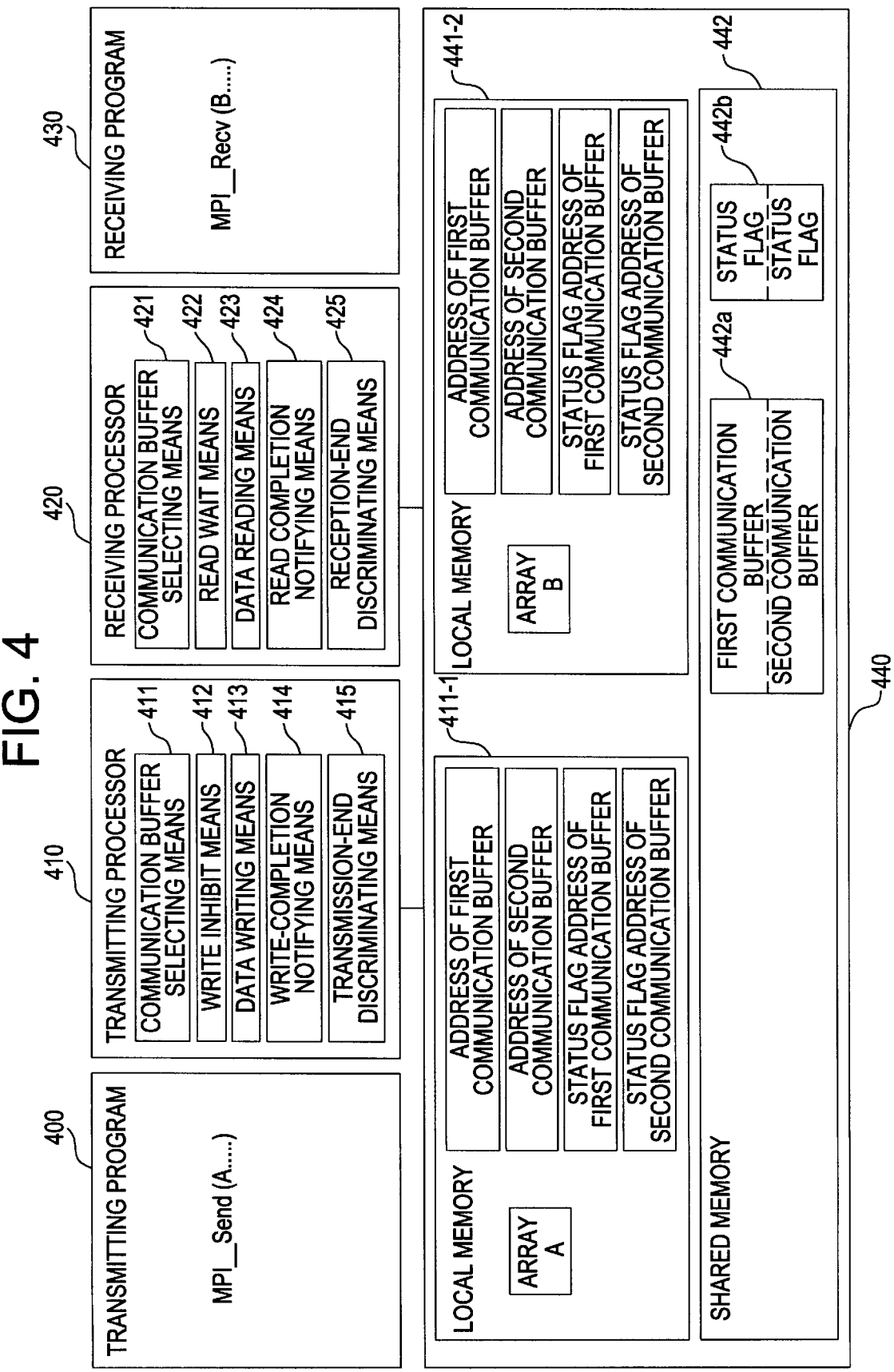
FIG. 4 is a diagram showing the construction of an embodiment of the present invention.

FIG. 4 is a diagram showing an embodiment of data communication in a multiprocessor system according to the present invention. Data is transmitted and received between the local memories of the processors via the communication buffers in accordance with transmission and reception requests contained in a user program.

As shown in FIG. 4, data communication according to the present invention is implemented by a transmitting program 400, a receiving program 430, a transmitting processor 410, a receiving processor 420 and a storage device 440. The transmitting processor 410 and receiving processor 420 have constructions similar to those shown in FIGS. 1 through 3.

The transmitting program 400 includes a request [MPI_Send (A . . . )] for transmitting the data of an array A in one local memory 441 to the receiving program 430on the side of the receiving processor, and the receiving program 430 includes a request [MPI_Recv (B . . . )] for receiving data sent from the transmitting program 400 on the side of the transmitting processor to an array B in the other local memory 441. The arrays A and B have the same size.

The transmitting program 400 is divided into a shared memory area 442 and local memory areas 441. Two communication buffers (referred to as first and second communication buffers for the sake of description) 442a corresponding to the receiving processor as well as status flags 442b allocated to the respective communication buffers for indicating the status of these buffers are allocated to the shared memory area 442.

The allocation may be performed statically before execution of the transmitting program or dynamically in response to the initial communication request.

The addresses of these buffers are expanded in the transmitting processor 410 and receiving processor 420 after allocation. The processors 410, 420 store addresses to the communication buffers 442a and status flags 442b in the local memories 441 (441-1, 441-2) corresponding to the respective processors. It is possible to access the buffers at the time of communication processing.

The array A is assigned to the local memory 441-1 corresponding to the transmitting processor 410, and the array B is assigned to the local memory 441-2 corresponding to the receiving processor 420.

The transmitting processor 410 includes communication buffer selecting means 411, write inhibit means 412, data writing means 413, write-completion notifying means 414 and transmission-end discriminating means 415. These means correspond to the means 11–15 of the transmitting processor 1 described above. The receiving processor 420 includes communication buffer selecting means 421, read wait means 422, data reading means 423, read completion notifying means 424 and reception-end discriminating means 425. These means correspond to the means 21–25 of the receiving processor 2 described above.

The operation of this embodiment will now be described in detail based upon the processing flows of FIGS. 2 and 3 with reference to the FIGS. 4, 5 and 6, as compared to FIG. 7.

The operation of the transmitting processor 410 will be described first.

With reference to FIG. 4, the communication buffer selecting means 411 of the transmitting processor 410 responds to a transmission request from the transmitting program 400 by selecting one of the two communication buffers possessed by the receiving processor 420, which is the communicating party. If this is the initial execution of this operation in response to a transmission request, then the communication buffer selecting means 411 selects the first communication buffer. Next, it is determined whether the status flag of this communication buffer is in the write-enabled state. If the status flag is not in the write-enabled state, the system waits for the write-enabled state to be attained. When the write-enabled state is attained, the communication buffer is reset to the write-disabled state by the write inhibit means 12 in order to inhibit a third-party transmitting processor from writing data to this communication buffer.

Next, the data writing means 413 copies the data of the array A in the local memory 411-1 to the (first) communication buffer (the size of the data copied is equivalent to the size of the communication buffer). Upon the completion of the copying operation, the write-completion notifying means 414 changes the status flag of this communication buffer to the write-enabled state.

The state of the status flag of the communication buffer undergoes a transition that will be described with reference to FIG. 5. The state transition applies to the status flags of all communication buffers.

Figure 5:
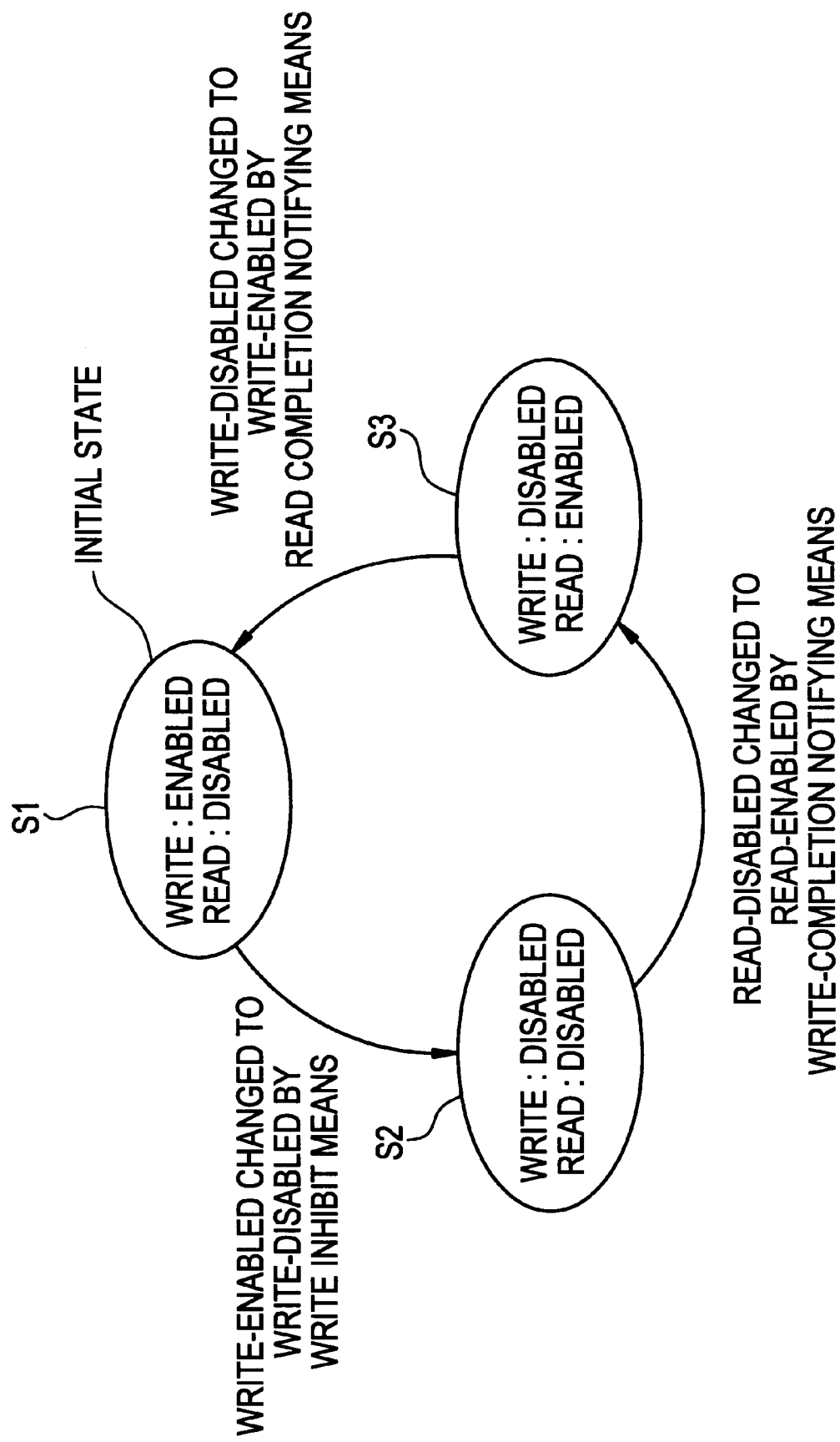
FIG. 5 is a diagram useful in describing the transition of the status of a status flag corresponding to a communication buffer in the embodiment of the present invention.

As shown in FIG. 5, the initial state (S1) of a status flag is "write: enabled"; and "read: disabled". This state is changed to the state (S2) "write: disabled"; and "read: disabled" solely by the write inhibit means 412 of the transmitting processor 410.

Next, this state can be changed only by the write-completion notifying means 414 of the transmitting processor 410 that has implemented the function of the write inhibit means 412. The state "write: disabled" is left as is but "read: disabled" is changed to "read: enabled" (state S3). Reference to the read enabled/disabled states is made by the read wait means 422 of the receiving processor 420, described later. Particular reference is made to an instance where state changes from "read: disabled" to "read: enabled".

If the writing of data from a communication buffer is completed, the receiving processor 420 returns the status of the communication buffer to the initial state (S1), namely "write: enabled"; and "read: disabled". The status flag thus takes on the three states S1, S2 and S3.

The operation of the transmitting processor 410 that follows the execution of processing by the write-completion notifying means 414 will now be described.

After notification of the completion of the write operation is given, the transmission-end discriminating means 415 determines whether all of the data of array that is to be transmitted has been written to a communication buffer. The transmission-end discriminating means 415 terminates processing in regard to the transmission request if no data remains and returns control to the communication buffer selecting means 411 if unsent data remains. When control returns to the communication buffer selecting means 411, the latter selects the second communication buffer and not the first communication buffer that was chosen initially and delivers control to the write inhibit means 412. Thus, the transmission-end discriminating means 415 causes the functions of the above-described means to be implemented repeatedly until transmission processing ends.

Operation of the receiving processor will now be described if with reference to FIG. 4.

The communication buffer selecting means 421 of the receiving processor 420 responds to a reception request from the receiving program 430 by selecting one of the two communication buffers possessed by this processor. If this is the initial execution of this operation in response to a reception request, then the communication buffer selecting means 421 selects the first communication buffer and waits for this status flag to attain the read-enabled state.

When the read-enabled state is attained, the status flag is left unchanged and the data writing means 413 copies the data of the communication buffer to the array B of the local memory 414-2.

Upon completion of the copying operation, the read completion notifying means 424 changes the status flag of the communication buffer to the read-disabled, write-enabled state (state S2 in FIG. 5). This change instate is as described above in connection with FIG. 5.

After the. change in state is made, the reception-end discriminating means 425 determines whether all of the data to be received has been read in. The reception-end discriminating means 425 terminates reception processing if all of the data has been read in. If all of the data has not been read in, then the reception-end discriminating means 425 returns control to the communication buffer selecting means 421. Upon return of control, the communication buffer selecting means 421 selects the second communication buffer rather than the first communication buffer selected previously.

Thus, the reception-end discriminating means 425 causes the functions of the above-described means 421–425 to be executed repeatedly until transmission processing ends.

Thus, in this embodiment of the present invention, the transmitting processor 410 and receiving processor 420 operate so as to transmit and receive data via the communication buffers 442a in response to transmission and reception requests.

The operation for writing data to the two communication buffers and the operation for reading data from the two communication buffers will be described in further detail with reference to FIG. 6 by dividing the passage of time into steps. Further, as an example for purposes of comparison, FIG. 7 illustrates a similar flow in the conventional communication method in a case where one specific communication buffer. FIGS. 6 and 7 will be compared.

Figure 6:
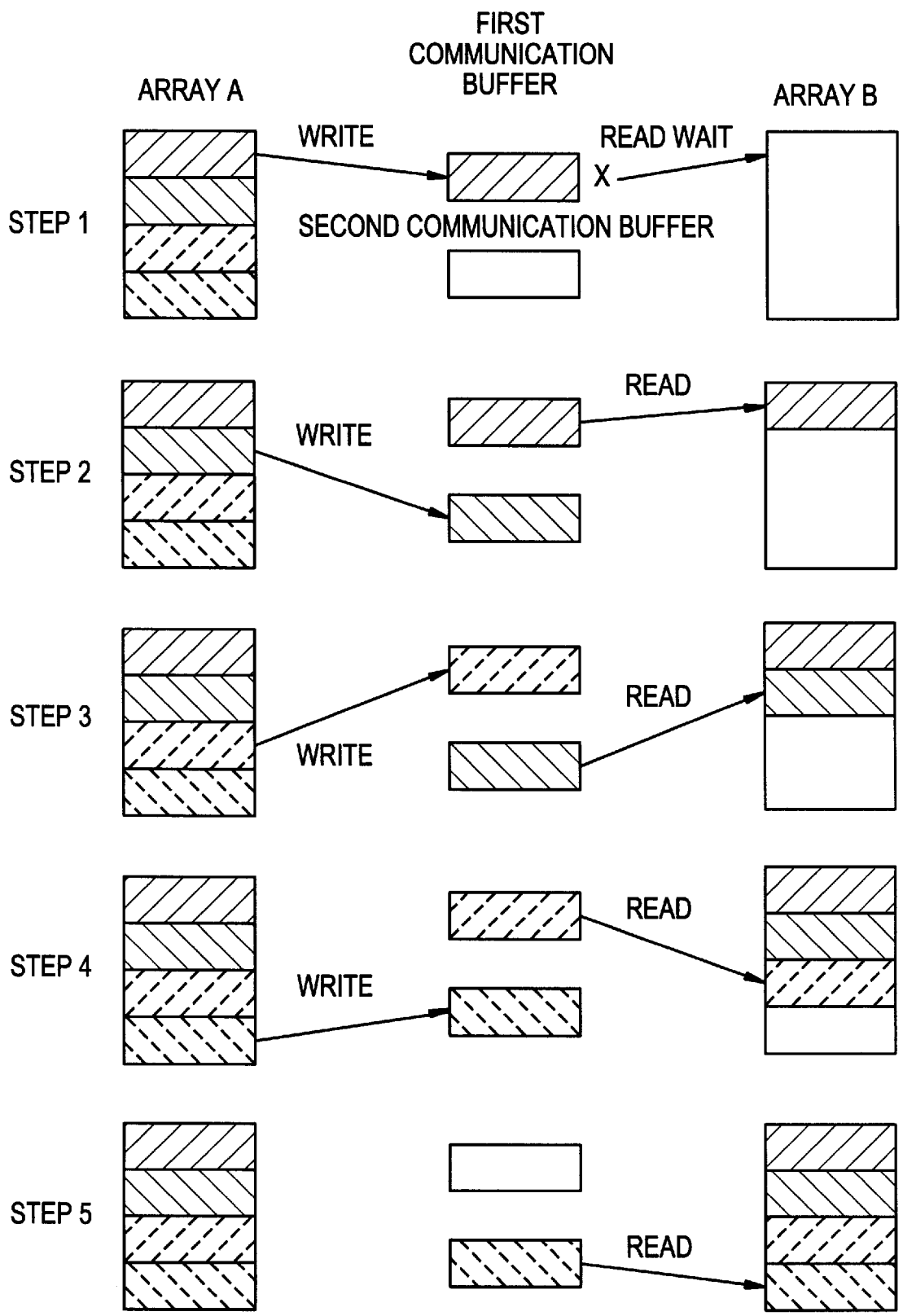
FIG. 6 is a diagram schematically illustrating, on a step-by-step basis, the flow of data via two communication buffers in the embodiment of the present invention.

With reference to FIG. 6, the transmitting processor initially writes data to the first communication buffer. With the exception of Step 1, in which the receiving processor must wait to read in data during this write operation, waiting for access to a communication buffer almost never occurs.

By contrast, if there is only one communication buffer, as shown in FIG. 7 illustrating the prior art, the receiving processor waits to read in data during the time that the transmitting processor is writing data, and the transmitting processor waits to write data during the time that the receiving processor is reading in data. The time corresponding to the third step in FIG. 7 represents extra time not required in FIG. 6.

Thus, in accordance with the present invention, communication performance, especially effective utilization of communication bandwidth, is improved by shortening waiting time for writing data to and reading data from communication buffers. The reason for this is that a transmitting processor and a receiving processor respond to transmission and reception requests by selectively switching between two communication buffers in accordance with the same rule to transmit and receive data.

As many apparently widely different embodiments of the present invention can be made without departing from the spirit and scope thereof, it is to be understood-that the invention is not limited to the specific embodiments thereof except as defined in the appended claims.

What is claimed is:

1. A data communication system in a multiprocessor system having a plurality of processors and a storage device that includes a shared memory, which is shared by the plurality of processors, and a local memory provided for each processor, and communicating between said processors, wherein (1) a processor on a transmitting side includes:
 (1a) communication buffer selecting means for selecting one of two communication buffers of the shared memory in accordance with a given rule;
 (1b) write inhibit means for changing the selected communication buffer to a write-disabled state in order to inhibit writing of the selected communication buffer by other processors;
 (1c) data writing means for copying data from the local memory that corresponds to this processor to the selected communication buffer;
 (1d) write-completion notifying means for notifying a receiving processor of completion of writing; and
 (1e) transmission-end discriminating means for discriminating end of transmission processing by judging whether all data to be transmitted has been written to the communication buffer; and (2) a processor on a receiving side includes:
 (2a) communication buffer selecting means for selecting one of said two communication buffers of the shared memory by a rule corresponding to that of said communication buffer selecting means of the processor on the transmitting side;
 (2b) read wait means for causing waiting until the selected communication buffer attains a read-enabled state;
 (2c) data reading means for copying data from the selected communication buffer to the local memory that corresponds to this processor;
 (2d) read completion notifying means for changing said communication buffer to a write-enabled state after data is read in; and
 (2e) means for discriminating end of reception processing.

2. The system according to claim 1, wherein when transmitted data is written to a communication buffer, said communication buffer selecting means of said processor on the transmitting side writes the data by alternately selecting first and second communication buffers of said shared memory; and said buffer selecting means of said processor on the receiving side reads in data by alternately selecting said first and second communication buffers of said shared memory in accordance with a rule corresponding to that of said communication buffer selecting means of said processor on the transmitting side.

3. The system according to claim 1, wherein said shared memory has, for each of the two communication buffers, a status flag for controlling write and read enable/disable of the communication buffer;

the initial state of the status flag being write-enabled and read-disabled;

said write inhibit means of said processor on the transmitting side setting the status flag of the selected communication buffer from write-enabled to write-disabled;

said write-completion notifying means setting the status flag of the selected communication buffer from read-disabled to read-enabled; and said read completion notifying means of said processor on the receiving side setting said status flag from write-disabled to write-enabled.

4. A data communication system in a multiprocessor system constituted by a plurality of processors and a storage device, wherein (1) said storage device has:
 (1a) a shared memory area accessible from each of the processors; and
 (1b) local memory areas accessible only from specific processors among said plurality of processors;

(2) a transmitting processor of said processors has:
 (2a) communication buffer selecting means;
 (2b) write inhibit means;
 (2c) data writing means;
 (2d) write-completion notifying means; and
 (2e) transmission-end discriminating means;

(3) a receiving processor of said processors has:
  (3a) communication buffer selecting means;
  (3b) read wait means;
  (3c) data reading means;
  (3d) read completion notifying means; and
  (3e) reception-end discriminating means;
(4) wherein said transmitting processor responds to a transmission request by:
  (4a) selecting one of two communication buffers of said shared memory by said communication buffer selecting means;
  (4b) causing said write inhibit means to wait until a communication flag corresponding to the selected communication buffer attains a write-enabled state and, if the write-enabled state is attained, to change the communication flag to a write-disabled state so that data cannot be written to said communication buffer from other processors;
  (4c) causing said data writing means to write transmitted data of a size equivalent to that of said communication buffer to said communication buffer;
  (4d) changing the state of the communication flag corresponding to said communication buffer to a read-enabled state, while leaving the write-disabled state as is, by said write-completion notifying means after writing of the transmitted data to said communication buffer has been completed;
  (4e) causing said transmission-end discriminating means to return control to said communication buffer selecting means if transmitted data remains and to terminate transmission processing if no transmitted data remains;
  (4f) causing said communication buffer selecting means to which control has been returned to select the other of said two communication buffers that is different from the communication buffer that was selected previously; and
  (4g) repeatedly executing processing for implementing each of said communication buffer selecting means, said write inhibit means, said data writing means, said write-completion notifying means and said transmission-end discriminating means until transmission processing is judged to have ended by said transmission-end discriminating means; and
(5) said receiving processor responds to a reception request by:
  (5a) selecting one of said two communication buffers of said shared memory by said communication buffer selecting means in accordance with an alternating rule corresponding to that used by the communication buffer selecting means of said transmitting processor;
  (5b) causing said read wait means to wait until a communication flag corresponding to the selected communication buffer attains a read-enabled state;
  (5c) causing said data reading means to read in data from said communication buffer if the read-enabled state has been attained;
  (5d) changing the communication flag to a read-disabled and write-enabled state by said read completion notifying means after read-in has been completed;
  (5e) causing said reception-end discriminating means to return the control step to said communication buffer selecting means if data to be received remains, and to terminate reception processing if no data to be received remains;
  (5f) causing said communication buffer selecting means to which the control step has been returned to select the other of said two communication buffers that is different from the communication buffer that was selected previously; and
  (5g) repeatedly executing processing for implementing each of said communication buffer selecting means, said read wait means, said data reading means, said read completion notifying means and said reception-end discriminating means until reception processing is judged to have ended by said reception-end discriminating means.

5. A recording medium in a multiprocessing system having a plurality of processors and a storage device that includes a shared memory, which is shared by the plurality of processors, and a local memory provided for each processor, wherein said recording medium stores:
  (1) a program in accordance with which a processor on a transmitting side implements the function of the following steps (1a) through (1e):
    (1a) selecting one of two communication buffers of said shared memory in accordance with a given rule;
    (1b) changing the selected communication buffer to a write-disabled state in order to inhibit writing of the selected communication buffer by other processors;
    (1c) copying data from the local memory that corresponds to this processor to the selected communication buffer;
    (1d) notifying a receiving processor of completion of writing; and
    (1e) discriminating end of transmission processing by judging whether all data to be transmitted has been written to said communication buffer; and
  (2) a program in accordance with which a processor on the receiving side implements the function of the following steps (2a) through (2b):
    (2a) selecting one of said two communication buffers of the shared memory by a rule corresponding to that of said communication buffer selecting step of the processor on the transmitting side;
    (2b) performing control in such a manner that the processor on the receiving side is made to wait until the selected communication buffer attains a read-enabled state;
    (2c) copying data from the selected communication buffer to the local memory that corresponds to this processor;
    (2d) changing said communication buffer to a write-enabled state after data is read in; and
    (2e) discriminating end of reception processing.

6. A data communicating method in a multiprocessing system having a plurality of processors and a storage device that includes a shared memory, which is shared by the plurality of processors, and a local memory provided for each processor, wherein the method comprises:
  (1) as for a processor on a transmitting side the following steps (1a) through (1e):
    (1a) selecting one of two communication buffers of said shared memory in accordance with a given rule;
    (1b) changing the selected communication buffer to a write-disabled state in order to inhibit writing of the selected communication buffer by other processors;
    (1c) copying data from the local memory that corresponds to this processor to the selected communication buffer;
    (1d) notifying a receiving processor of completion of writing; and (1e) discriminating end of transmission processing by judging whether all data to be transmitted has been written to said communication buffer; and (2) as for a processor on the receiving side, the following steps (2a) through (2e):

(2a) selecting one of said two communication buffers of the shared memory by a rule corresponding to that of said communication buffer selecting steps of the processor on the transmitting side;

(2b) performing control in such a manner that the processor on the receiving side is made to wait until the selected communication buffer attains a read-enabled state;

(2c) copying data from the selected communication buffer to the local memory that corresponds to this processor;

(2d) changing said communication buffer to a write-enabled state after data is read in; and (2e) discriminating end of reception processing.

* * * * *